United States Patent
Mordukhovich

(10) Patent No.: US 10,619,679 B2
(45) Date of Patent: Apr. 14, 2020

(54) METHOD OF ACTUATING A CLUTCH WITH DECREMENTAL TORQUE FUNCTION

(71) Applicant: AVL Powertrain Engineering, Inc., Plymouth, MI (US)

(72) Inventor: Gregory Mordukhovich, Bloomfield Hills, MI (US)

(73) Assignee: AVL Powertrain Engineering, Inc., Plymouth, MI (US)

( * ) Notice: Subject to any disclaimer, the term of this patent is extended or adjusted under 35 U.S.C. 154(b) by 0 days.

(21) Appl. No.: 16/377,386

(22) Filed: Apr. 8, 2019

(65) Prior Publication Data

US 2019/0234466 A1    Aug. 1, 2019

Related U.S. Application Data

(62) Division of application No. 15/051,010, filed on Feb. 23, 2016, now Pat. No. 10,288,128.

(Continued)

(51) Int. Cl.
| | |
|---|---|
| *F16D 13/52* | (2006.01) |
| *F16D 13/64* | (2006.01) |
| *F16D 25/0638* | (2006.01) |

(52) U.S. Cl.
CPC ........... *F16D 13/52* (2013.01); *F16D 13/648* (2013.01); *F16D 25/0638* (2013.01); *F16D 2300/021* (2013.01)

(58) Field of Classification Search
None
See application file for complete search history.

(56) References Cited

U.S. PATENT DOCUMENTS

| | | | |
|---|---|---|---|
| 2,326,960 | A | 8/1943 | McCune |
| 3,384,214 | A | 5/1968 | Wilson |

(Continued)

FOREIGN PATENT DOCUMENTS

| | | |
|---|---|---|
| DE | 102013224591 A1 | 6/2014 |
| JP | S61180028 A | 8/1986 |
| JP | 07042757 | 2/1995 |

OTHER PUBLICATIONS

Jen, Tien-Chen et al., Thermal Analysis of a Wet-Disk Clutch Subjected to a Constant Energy Engagement, ScienceDirect, Mar. 2007.

(Continued)

*Primary Examiner* — Colby M Hansen
(74) *Attorney, Agent, or Firm* — Harness, Dickey & Pierce, P.L.C.

(57) ABSTRACT

A method for reducing overheating in a clutch assembly having a clutch housing, a shaft, and a clutch pack. The clutch pack includes a backing plate, an applied plate, a plurality of friction plates, and a plurality of reaction plates. A primary actuator applies pressure to the applied plate to longitudinally compress the entire clutch pack and couple rotation of the clutch housing and the shaft. A secondary actuator applies pressure to at least one plate in the plurality of friction plates and the plurality of reaction plates to longitudinally move the at least one plates independently of the applied plate. This relieves some of the torque transmitted across the clutch pack adjacent the applied plate and reduces localized temperature spikes in the clutch pack adjacent to the applied plate.

19 Claims, 8 Drawing Sheets

Related U.S. Application Data

(60) Provisional application No. 62/121,840, filed on Feb. 27, 2015, provisional application No. 62/121,864, filed on Feb. 27, 2015.

(56) References Cited

U.S. PATENT DOCUMENTS

| | | | |
|---|---|---|---|
| 4,020,933 | A | 5/1977 | Gill |
| 4,144,955 | A | 3/1979 | Garnier |
| 4,372,434 | A | 2/1983 | Aschauer |
| 4,396,101 | A | 8/1983 | Black |
| 4,664,240 | A | 5/1987 | Majima et al. |
| 5,901,826 | A | 5/1999 | Datta |
| 6,095,946 | A | 8/2000 | Maguire et al. |
| 6,543,596 | B2 | 4/2003 | Martin et al. |
| 6,868,949 | B2 | 3/2005 | Braford, Jr. |
| 7,258,208 | B1 | 8/2007 | Dennis et al. |
| 8,409,053 | B2 | 4/2013 | Samie et al. |
| 8,640,843 | B2 | 2/2014 | Ogasawara et al. |
| 9,677,622 | B2 | 6/2017 | Mordukhovich et al. |
| 10,151,355 | B2 * | 12/2018 | Elsesser .................. F16D 13/72 |
| 2007/0080041 | A1 | 4/2007 | Goto et al. |
| 2010/0270117 | A1 * | 10/2010 | Boonpongmanee ........................ F16D 25/0638 192/58.2 |
| 2011/0067969 | A1 | 3/2011 | Reed et al. |
| 2015/0275993 | A1 * | 10/2015 | Elsesser .................. F16D 13/72 188/264 D |
| 2016/0252140 | A1 | 9/2016 | Mordukhovich |
| 2016/0252141 | A1 | 9/2016 | Mordukhovich et al. |
| 2016/0363175 | A1 | 12/2016 | Vierk et al. |

OTHER PUBLICATIONS

Extended European Search Report for Application No. 16157514.7 dated May 6, 2016.
Chinese Office Action for Application No. 201521075637.3 dated Apr. 5, 2016.
Extended European Search Report for Application No. 16157516.2 dated Jul. 29, 2016.
European Office Action for Application No. 16157516.2 dated Aug. 21, 2017; 4 pages.

* cited by examiner

METHOD OF ACTUATING A CLUTCH WITH DECREMENTAL TORQUE FUNCTION

CROSS-REFERENCE TO RELATED APPLICATIONS

This application is a divisional of U.S. Utility application Ser. No. 15/051,010, filed on Feb. 23, 2016, which claims the benefit of U.S. Provisional Application No. 62/121,840, filed on Feb. 27, 2015, and U.S. Provisional Application No. 62/121,864, filed on Feb. 27, 2015. Additionally, this application is related to U.S. Utility application Ser. No. 14/956,861, filed on Dec. 2, 2015, now U.S. Pat. No. 9,920,795 and U.S. Utility application Ser. No. 15/051,085, filed Feb. 23, 2016, now U.S. Pat. No. 9,677,622. The entire disclosures of the applications referenced above are incorporated herein by reference.

FIELD

The present disclosure generally relates to vehicle transmissions, and more specifically to, clutch assemblies having a plurality of friction plates and a plurality of reaction plates that are disposed in an interleaving relationship.

BACKGROUND

This section provides background information related to the present disclosure which is not necessarily prior art.

Torque clutch assemblies are commonly used in vehicle transmissions to shift into a forward gear, to shift between forward gears, or to shift into a reverse gear. As a shift is being effectuated by the transmission, torque clutch assemblies selectively supply torque from a prime mover, such as an engine, to one or more gears of the transmission. Because torque clutch assemblies can decouple the prime mover from the one or more gears of the transmission, shifts can be accomplished without stalling the engine and/or binding the transmission.

Such torque clutch assemblies may generally include a clutch housing and a shaft that is disposed within the clutch housing. A clutch pack may be disposed radially between the clutch housing and the shaft. The clutch pack selectively couples rotation of the clutch housing and the shaft. The clutch pack may include various combinations of friction plates and reaction plates that transfer torque between the clutch housing and the shaft when the friction plates and reaction plates are pressed together in an engagement direction by a clutch actuator. While the friction plates and the reaction plates are rotatably coupled to the clutch housing and the shaft, they are moveable in the engagement direction with respect to the clutch housing and the shaft. A backing plate may be provided at one end of the clutch pack that is retained on either the clutch housing or the shaft. Longitudinal movement of the backing plate relative to the clutch housing and the shaft may be limited such that the backing plate acts as a stop for the friction plates and reaction plates when the friction plates and reaction plates are pushed in the engagement direction towards the backing plate by the clutch actuator. A single applied plate is provided at an opposite end of the clutch pack. Like the friction plates and the reaction plates, the single applied plate is moveable in the engagement direction with respect to the clutch housing and the shaft.

The clutch actuator may be configured to apply pressure to the single applied plate in the engagement direction. This unidirectional pressure causes the single applied plate to slide towards the backing plate in the engagement direction. As a result, the friction plates and the reaction plates of the clutch pack are squeezed between the single applied plate and the backing plate. In other words, actuation of the clutch actuator longitudinally compresses the clutch pack in the engagement direction. Torque transfer between the friction plates and the reaction plates then occurs through friction interfaces that are disposed between adjacent friction plates and reaction plates. The clutch actuator may release the unidirectional pressure applied to the single applied plate to disengage the clutch pack. When the clutch actuator releases the unidirectional pressure applied to the single applied plate, the single applied plate moves longitudinally in a disengagement direction. The disengagement direction is generally opposite the engagement direction such that the single applied plate moves away from the backing plate in the disengagement direction, allowing the clutch pack to longitudinally expand.

The clutch engagement process begins when the clutch actuator applies pressure to the single applied plate. Where the clutch assembly is a wet clutch assembly, the clutch engagement process may generally be described in three stages: the hydrodynamic stage, the squash stage, and lock-up stage. The hydrodynamic stage is the first stage in the clutch engagement process. While the clutch actuator is moving the single applied plate longitudinally toward the backing plate in the hydrodynamic stage, there is no contact between the friction plates and the reaction plates of the clutch pack and the friction plates and reaction plates remain separated by a fluid film. Typically, no torque is transferred between friction plates and the reaction plates and thus the clutch shaft and the housing in the hydrodynamic stage. However, it should be appreciated that small, incidental amounts of torque transfer may occur in the hydrodynamic stage through fluid shear occurring within the fluid film disposed between adjacent friction plates and reaction plates. The squash stage is the second stage in the clutch engagement process. The clutch actuator is still moving the single applied plate longitudinally toward the backing plate in the squash stage, but now the friction plates have begun to contact the applied plates. In the squash stage, there is slippage (i.e. relative motion) between the friction plates and the reaction plates despite the friction plates contacting the reaction plates at the friction interfaces. The kinetic energy of the relative motion between the friction plates and the reaction plates is absorbed during slippage and is converted to friction generated heat. Although this heat is undesirable from a thermal management standpoint, this slippage is necessary to allow for the gradual transfer of torque between the shaft and the housing without stalling the prime mover, shocking the clutch assembly (which could lead to structural failures), and rapid, jerky acceleration. The majority of the torque transferred through the clutch assembly during the squash stage is done at the points of material contact at the friction interfaces between the friction plates and the reaction plates with tribo-chemical, mixed lubrication and/or elasto-hydrodynamic lubrication layers and not through fluid shear. The lock-up stage is the third stage in the clutch engagement process. In the lock-up stage, the clutch actuator is still applying pressure to the single applied plate in the engagement direction, but the single applied plate has stopped moving longitudinally toward the backing plate because the clutch pack is fully compressed between the single applied plate and the backing plate. In the lock-up stage, there is no slippage (i.e. relative motion) between the friction plates and the reaction plates such that the shaft rotates with the clutch housing and 100 percent of the torque at the shaft is transferred to the clutch housing. Accordingly, in the lock-up stage, there is little to no heat generation between the friction plates and the reaction plates and the friction interfaces begin to cool.

Temperature as it relates to the torque being transmitted through the clutch assembly is a primary design consideration when selecting the size, number, and material of the friction plates and the reaction plates. In dual-clutch transmissions in particular, temperature build-up in the friction interface(s) near the clutch actuator is a primary limiting factor. Temperature build-up in the clutch assembly limits toque capacity and is also a major consideration when designing clutch cooling components. In the case of wet clutches, where the friction plates and reaction plates are immersed in fluid, selection of the viscosity and formulation of the fluid, the fluid capacity of the clutch housing, and the pumping capacity of the clutch assembly are closely tied to the expected temperature build-up. Temperature build-up in the clutch assembly occurs when the clutch actuator compresses the clutch pack, which produces friction generated heat as the friction plates and the reaction plates contact one another. The unidirectional pressure applied to the clutch pack in the engagement direction leads to variation in the time the friction plates are compressed in contact with the reaction plates. This results in temperature variations among the friction interfaces, with the highest temperatures occurring at the friction interfaces that have been in contact the longest (i.e. the friction interfaces closest to the clutch actuator). The temperature build-up in clutch assemblies has been studied in detail. Authors Ten et al. published one such study, entitled "Thermal analysis of a wet-disk clutch subjected to a constant energy engagement," in the International Journal of Heat and Mass Transfer, Volume 51, Issues 7-8, April 2008, Pages 1757-1769. This study confirms that the highest temperatures in clutch assemblies typically occur at the friction interfaces nearest the clutch actuator. Accordingly, the friction interfaces nearest the clutch actuator act as a design constraint and the overall clutch assembly must be designed to avoid overheating of these friction interfaces.

In many clutch assemblies, peak temperatures occur at the friction interface that is the second closest to the clutch actuator. This is attributed to the fact that the single applied plate, clutch actuator, and clutch housing can act as a heat sink, cooling the friction interface that is closest to the clutch actuator. As a result, the friction interface that is second closest to the clutch actuator is often the one that overheats and is therefore a primary limiting factor in the design of clutch assemblies. To reduce the likelihood of overheating the friction interfaces nearest the clutch actuator, oversized friction plates may be used that have greater thickness and/or larger diameters. The increased mass and/or surface area of the oversized friction plates improves heat dissipation away from the friction interfaces and also makes the friction plates less prone to heat related failures. However, the size increase of the friction plates negatively impacts the efficiency, packaging, and price of the clutch assembly. Another way overheating is addressed is by increasing the fluid capacity of the clutch housing and/or pumping capacity of the clutch assembly. While increasing these parameters provides better cooling to the friction interfaces, greater fluid capacity and pumping capacity negatively impacts efficiency, packaging, and price of the clutch assembly.

Another approach for reducing the likelihood of overheating the friction interfaces nearest the clutch actuator is to control clutch actuation and/or the prime mover such that reduced torque is transmitted through the clutch assembly. In some instances, actuation of the clutch assembly may be controlled so as to provide for early clutch engagement before the amount of torque transmitted through the clutch assembly is high (i.e. early lock-up). In other instances, the torque transmitted through the clutch during vehicle launch may be reduced by launching the vehicle in second gear instead of in first gear. As disclosed in U.S. Pat. No. 6,095,946 to Maguire et al., another control method is to limit the output of the engine during clutch engagement so that repeated shifts will not overheat the friction interface. For example, fuel to the engine may be limited or the spark timing may be retarded to reduce the amount of torque that the engine supplies to the clutch assembly. A major drawback to these approaches however is that drive quality is negatively impacted. Acceleration and power may be compromised under these approaches and shift quality is reduced. Noise, vibration, and harshness (NVH) is often increased under such control schemes, which negatively affects customer driving experience. What is needed is a solution that reduces the likelihood of overheating the friction interfaces without the associated efficiency, packaging, cost, and drive quality drawbacks noted above.

SUMMARY

This section provides a general summary of the disclosure, and is not a comprehensive disclosure of its full scope or all of its features.

In accordance with one aspect of the subject disclosure, a clutch assembly that is less prone to overheating is provided. The clutch assembly generally includes a clutch housing, a shaft, and a clutch pack. The clutch housing has an internal surface that defines an inner cavity within the clutch housing. The shaft is disposed within the inner cavity of the clutch housing. The shaft extends along a longitudinal axis and has an outer surface. The clutch pack is disposed radially between the clutch housing and the shaft. The clutch pack selectively couples rotation of the clutch housing and the shaft and includes a first end and a second end. The second end of the clutch pack is opposite the first end of the clutch pack such that the second end of the clutch pack is longitudinally spaced from the first end of the clutch pack.

The clutch pack further includes a backing plate, an applied plate, a plurality of friction plates, and a plurality of reaction plates. The backing plate is disposed at the first end of the clutch pack and is retained on either the clutch housing or the shaft such that the backing plate cannot move longitudinally relative to the clutch housing and the shaft beyond a predetermined limit. The applied plate is disposed at the second end of the clutch pack. The applied plate is moveable along the longitudinal axis relative to the clutch housing and the shaft. The plurality of friction plates are disposed between the backing plate and the applied plate. Each friction plate in the plurality of friction plates is moveable along the longitudinal axis relative to the clutch housing and the shaft. The plurality of reaction plates are disposed between the backing plate and the applied plate in an interleaving relationship with the plurality of friction plates. Like the friction plates, each reaction plate in the plurality of reaction plates is moveable along the longitudinal axis relative to the clutch housing and the shaft. The clutch assembly also includes a primary actuator and a secondary actuator. The primary actuator selectively applies pressure to the applied plate at the second end of the clutch pack. By applying pressure to the applied plate at the second end of the clutch pack, the primary actuator moves the second end of the clutch pack toward the first end of the clutch pack. Because the backing plate at the first end of the clutch pack cannot move longitudinally beyond the predetermined limit, the clutch pack is longitudinally compressed, coupling rotation of the clutch housing and the shaft. The secondary actuator selectively applies pressure to at least one plate in the plurality of friction plates and reaction plates. By applying pressure to at least one of the friction plates and/or reaction plates, the secondary actuator longitudinally moves at least one of the friction plates and/or reaction plates independently of movement of the applied plate at the second end of the clutch pack.

The independent movement of at least one of the friction plates and/or reaction plates provided by the secondary actuator relieves some of the torque transmitted across the second end of the clutch pack during actuation of the primary actuator and yields a more uniform load distribution across the clutch pack. Advantageously, this reduces localized temperature spikes at the second end of the clutch pack, which occur in response to actuation of the primary actuator. Accordingly, the disclosed clutch assembly is less prone to overheating. At the same time, the size of the clutch pack and the cooling capacity of the clutch assembly can remain the same. Additionally, because the unique structure and actuation of the disclosed clutch assembly reduces localized temperature spikes at the second end of the clutch pack, the need for second gear launches, early clutch engagement, or a reduction in the output of the engine is obviated. Therefore, the disclosed clutch assembly does not suffer from the same efficiency, packaging, cost, and drive quality drawbacks associated with other solutions to friction interface overheating.

In accordance with another aspect of the subject disclosure, the secondary actuator may be replaced by a first set of secondary actuators that selectively applies pressure to a first reaction plate of the plurality of reaction plates. By applying pressure to the first reaction plate, the first set of secondary actuators longitudinally moves the first reaction plate independently of the applied plate. The clutch assembly may also include a second set of secondary actuators that selectively applies pressure to a second reaction plate of the plurality of reaction plates. By applying pressure to the second reaction plate, the second set of secondary actuators longitudinally moves the second reaction plate independently of both the applied plate and the first reaction plate. Advantageously, the first and second sets of secondary actuators apply more uniform pressure to the first and second reaction plates, respectively, and provide additional clutch engagement options. By way of example and without limitation, the first and second sets of secondary actuators apply pressure to and thereby move the first and second reaction plates either sequentially or concurrently to adjust (i.e. tune) the rate of torque transfer increase transmitted through the clutch pack.

In accordance with yet another aspect of the subject disclosure, a method of engaging the clutch assembly described herein is also provided. Again, the clutch assembly generally includes the shaft, the clutch housing, and the clutch pack. The clutch pack includes the backing plate and the applied plate. The plurality of friction plates and the plurality of reaction plates are disposed between the backing plate and the applied plate in an interleaving relationship. The method generally includes the steps of: applying torque to the shaft, preventing the backing plate from traveling longitudinally beyond a predetermined limit measured relative to the shaft and the clutch housing, applying pressure to at least one plate in the plurality of friction plates and reaction plates to move the at least one plate longitudinally toward the backing plate in order to compress a portion of the clutch pack disposed between the at least one plate and the backing plate, and applying pressure to the applied plate to move the applied plate longitudinally toward the backing plate in order to compress the plurality of friction plates and reaction plates between the applied plate and the backing plate to transfer torque from the shaft to the clutch housing via the clutch pack. During the step where a portion of the clutch pack is compressed in response to the application of pressure to the at least one plate, the portion of the clutch pack that is compressed includes any reaction plates of the plurality of reaction plates and any friction plates of the plurality of friction plates that are disposed between the at least one plate and the backing plate. By applying pressure to the clutch pack at different locations, the disclosed method distributes torque and therefore friction generated heat more evenly across the clutch pack to reduce the likelihood of overheating.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1A:
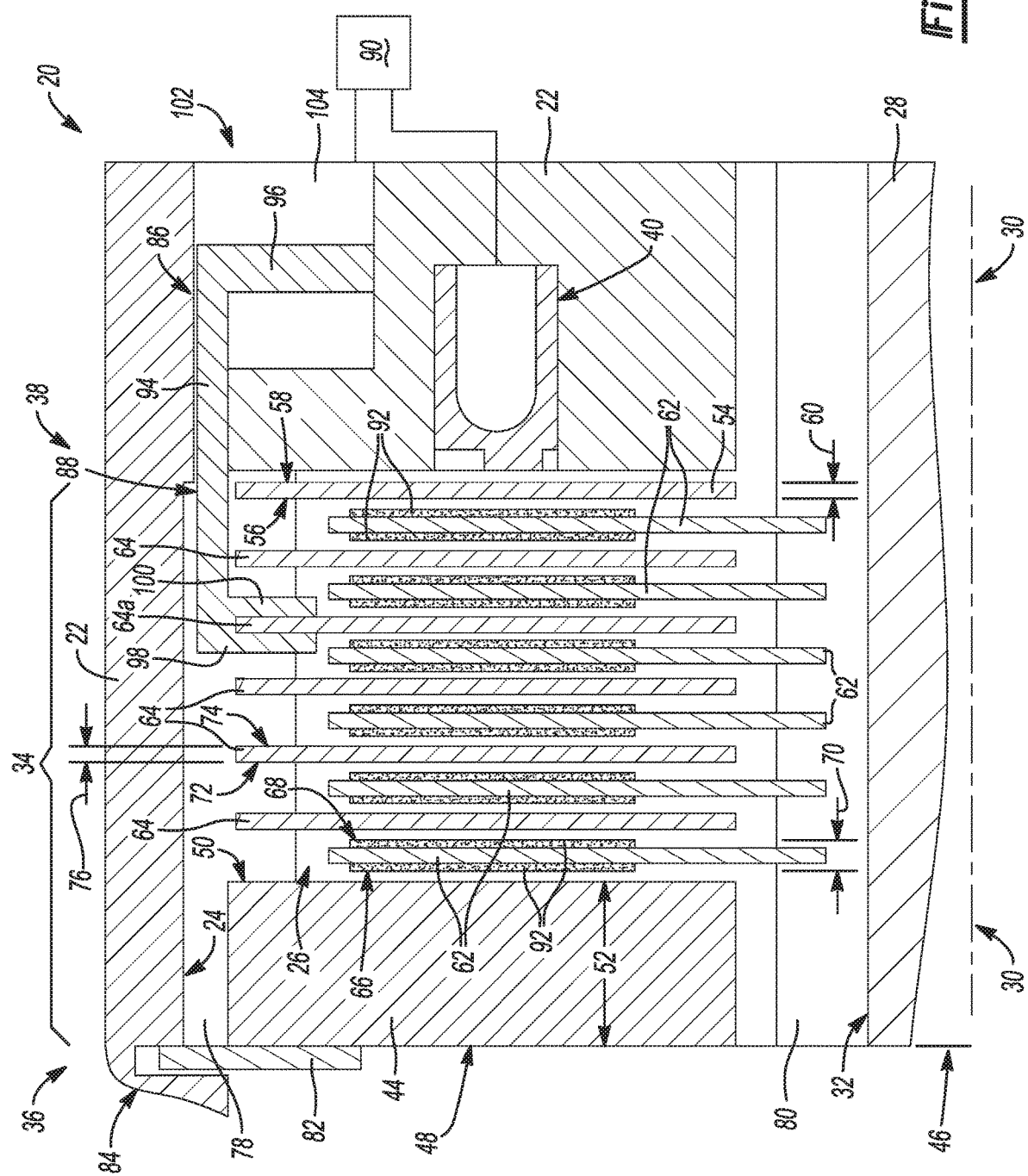
FIG. 1A is a partial, cross-sectional view of an exemplary clutch assembly constructed in accordance with the subject disclosure where the clutch pack is shown in an uncompressed state.

Referring to the Figures, wherein like numerals indicate corresponding parts throughout the several views, several clutch assemblies 20 with improved overheat resistance are disclosed.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Generally, clutch assemblies, such as the clutch assemblies 20 disclosed in the Figures, may be used in a transmission of a vehicle to shift into a forward gear, to shift between forward gears, or to shift into a reverse gear. The transmission may generally have a transmission case that houses the forward and/or reverse gears. The disclosed clutch assemblies 20 may be disposed within the transmission case, connected in series with the transmission case, or integral with the transmission case.

As illustrated in FIGS. 1A through 3, the clutch assembly 20 includes a clutch housing 22 having an internal surface 24 that defines an inner cavity 26. The inner cavity 26 is thus disposed within the clutch housing 22 and may have a variety of different shapes. By way of example and without limitation, the inner cavity 26 of the clutch housing 22 may have a cylindrical shape. A shaft 28 is disposed co-axially within the inner cavity 26 of the clutch housing 22. The shaft 28 extends along and operably rotates about a longitudinal axis 30. As such, it should be appreciated that the terms "longitudinally" and "longitudinal direction," as used herein, refer to movement in a direction that is substantially parallel with the longitudinal axis 30. The shaft 28 presents an outer surface 32 that may also be cylindrical in shape. A clutch pack 34 is disposed radially between the clutch housing 22 and the shaft 28. The clutch pack 34 selectively couples rotation of the clutch housing 22 and the shaft 28, as will be explained in greater detail below. The clutch pack 34 generally has a first end 36 and a second end 38 opposite the first end 36 that is longitudinally spaced from the first end 36.

Figure 3:
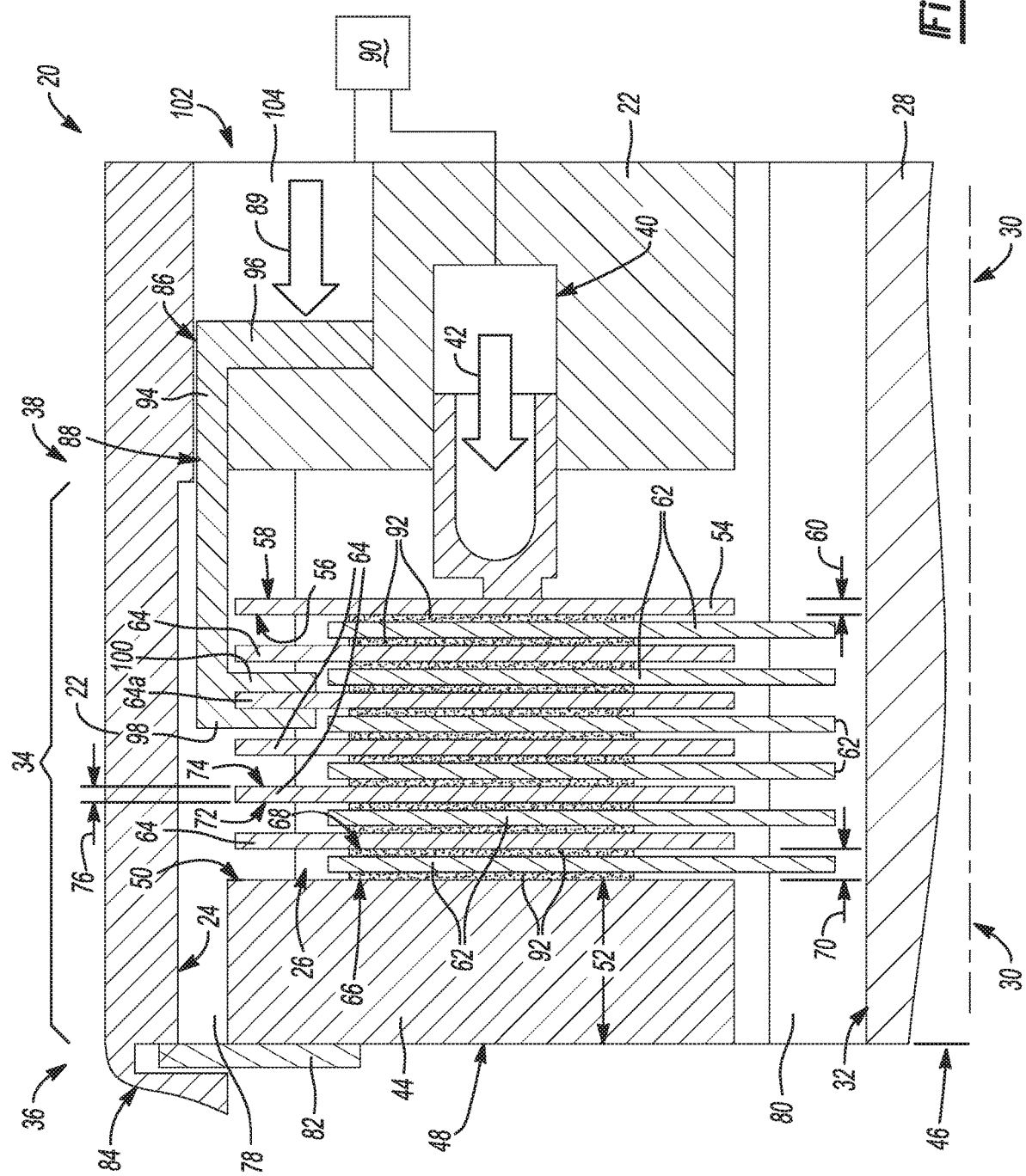
FIG. 3 is a partial, cross-sectional view of the clutch assembly of FIG. 1A where the clutch pack is in a compressed state with the primary actuator is applying pressure to the applied plate.

A primary actuator 40 is disposed adjacent the second end 38 of the clutch pack 34. The primary actuator 40 operably switches the clutch pack 34 between an uncompressed state (FIGS. 1A and 1B) and a compressed state (FIG. 3). In the uncompressed state, the primary actuator 40 does not apply pressure to the clutch pack 34. In the compressed state, the primary actuator 40 selectively applies a first pressure 42 to the second end 38 of the clutch pack 34 to force the second end 38 of the clutch pack 34 toward the first end 36 of the clutch pack 34. In other words, the primary actuator 40 longitudinally compresses the clutch pack 34 to switch the clutch pack 34 to the compressed state.

The clutch pack 34 includes a backing plate 44 disposed at the first end 36 of the clutch pack 34. The backing plate 44 is rotatably coupled with the clutch housing 22 such that the backing plate 44 rotates with the clutch housing 22. The backing plate 44 is retained on the clutch housing 22 such that the backing plate 44 cannot move longitudinally relative to the clutch housing 22 beyond a predetermined limit 46. In the example shown in FIGS. 1A through 3, the backing plate 44 is retained on the clutch housing 22 such that the backing plate 44 is limited from moving to the left beyond the predetermined limit 46. Accordingly, the backing plate 44 acts as a stop at the first end 36 of the clutch pack 34 such that the second end 38 of the clutch pack 34 moves relative to the backing plate 44 when the clutch pack 34 is switched between the uncompressed state and the compressed state by the primary actuator 40. Although the backing plate 44 may have a variety of different shapes, the backing plate 44 may have an annular shape. The backing plate 44 may also include a first backing plate side 48 and a second backing plate side 50 that is longitudinally spaced from the first backing plate side 48 by a first thickness 52.

The clutch pack 34 also includes an applied plate 54 disposed at the second end 38 of the clutch pack 34. The applied plate 54 is rotatably coupled with the clutch housing 22 such that the applied plate 54 rotates with the clutch housing 22. Although the applied plate 54 may have a variety of different shapes, the applied plate 54 may have an annular shape. Additionally, the applied plate 54 may include a first applied plate side 56 and a second applied plate side 58 that is longitudinally spaced from the first applied plate side 56 by a second thickness 60. While other configurations are possible, the second thickness 60 of the applied plate 54 may be less than or equal to the first thickness 52 of the backing plate 44. In other words, the backing plate 44 may be thicker than the applied plate 54 or the backing plate 44 and the applied plate 54 may have equal thicknesses. The applied plate 54 is acted on by the primary actuator 40 when the primary actuator 40 switches the clutch pack 34 to the compressed state. As illustrated in FIG. 3, the primary actuator 40 applies the predetermined pressure 42 to the second applied plate side 58 to force the applied plate 54 longitudinally toward the backing plate 44. This action moves the applied plate 54 in a direction that is parallel with the longitudinal axis 30 and compresses the clutch pack 34 against the backing plate 44.

The clutch pack 34 additionally includes a plurality of friction plates 62 and a plurality of reaction plates 64 that are disposed adjacent to one another in an interleaving relationship between the backing plate 44 and the applied plate 54. As such, the plurality of friction plates 62 and the plurality of reaction plates 64 collectively make up the clutch pack 34. The term "interleaving relationship" used herein means that the sequence of friction plates 62 and reaction plates 64 in the clutch pack 34 alternates, where a friction plate 62 is positioned next to a reaction plates 64, which is next to another friction plate 62. The plurality of friction plates 62 are rotatably coupled with the shaft 28 such that the plurality of friction plates 62 rotate with the shaft 28. Although the plurality of friction plates 62 may have a variety of different shapes, each friction plate 62 in the plurality of friction plates 62 may have an annular shape. Each friction plate 62 of the plurality of friction plates 62 may also include a first side 66 and a second side 68 that is longitudinally spaced from the first side 66 by a third thickness 70. While other configurations are possible, the third thickness 70 of each friction plate 62 of the plurality of friction plates 62 may be less than the first thickness 52 of the backing plate 44 and the second thickness 60 of the applied plate 54. In other words, the backing plate 44 and the applied plate 54 may each have a thicker construction than that of each friction plate 62 of the plurality of friction plates 62.

The plurality of reaction plates 64 are rotatably coupled with the clutch housing 22 such that the plurality of reaction plates 64 rotate with the clutch housing 22. Although the plurality of reaction plates 64 may have a variety of different shapes, each reaction plate 64 in the plurality of reaction plates 64 may have an annular shape. Each reaction plate 64 of the plurality of reaction plates 64 may also include a first face 72 and a second face 74 that is longitudinally spaced from the first face 72 by a fourth thickness 76. While other configurations are possible, the fourth thickness 76 of each reaction plate 64 of the plurality of reaction plates 64 may be less than the first thickness 52 of the backing plate 44 and the second thickness 60 of the applied plate 54. In other words, the backing plate 44 and the applied plate 54 may each have a thicker construction than that of each friction plate 62 of the plurality of friction plates 62 and each reaction plate 64 of the plurality of reaction plates 64. In some configurations, the fourth thickness 76 of each reaction plate 64 of the plurality of reaction plates 64 may equal the third thickness 70 of each friction plate 62 of the plurality of friction plates 62. Furthermore, it should be appreciated that because the plurality of friction plates 62 and the plurality of reaction plates 64 are disposed in an interleaving relationship, the first faces 72 of some of the reaction plates 64 face the second sides 68 of some of the friction plates 62 and the second faces 79 of some of the reaction plates 64 face the first sides 66 of some of the friction plates 62.

As noted above, the backing plate 44, the applied plate 54, and the plurality of reaction plates 64 in FIGS. 1A through 3 are rotatably coupled to the clutch housing 22. Although the structure that rotatably couples the backing plate 44, the reaction plate 54, and the plurality of reaction plates 64 to the clutch housing 22 may vary, this structure may include a first plurality of splines 78 that are disposed along the internal surface 24 of the clutch housing 22. As shown in FIGS. 1A-3, the first plurality of splines 78 extend parallel to the longitudinal axis 30 and engage the backing plate 44, the applied plate 54, and the plurality of reaction plates 64 to rotatably couple the clutch housing 22 with the backing plate 44, the reaction plate 54, and the plurality of reaction plates 64. On the other hand, the plurality of friction plates 62 in FIGS. 1A through 3 are rotatably coupled to the shaft 28. Although the structure that rotatably couples the plurality of friction plates 62 to the shaft 28 may vary, this structure may include a second plurality of splines 80 that are disposed along the outer surface 32 of the shaft 28. The second plurality of splines 80 extend parallel to the longitudinal axis 30 and engage the plurality of friction plates 62 to rotatably couple the shaft 28 with the plurality of friction plates 62. Notwithstanding the foregoing, other types of connections between the backing plate 44, the applied plate 54, the plurality of friction plates 62, the plurality of reaction plates 64, the clutch housing 22, and the shaft 28 may be used without departing from the scope of the subject disclosure. It should also be appreciated that the backing plate 44, the applied plate 54, the plurality of friction plates 62, the plurality of reaction plates 64 may be rotatably coupled to either the clutch housing 22 or the shaft 28 without departing from the scope of the subject disclosure such that various arrangements are possible.

As shown in FIGS. 1A through 3, the backing plate 44 is retained on the clutch housing 22 such that it cannot move longitudinally beyond the predetermined limit 46. This predetermined limit 46 may be measured relative to the applied plate 54 such that the backing plate 44 can only move so far away from the applied plate 54 before it is stopped. Although the structure that stops the backing plate 44 at the predetermined limit 46 may vary, in the configuration shown in FIGS. 1A through 3, this structure includes a retainer ring 82. The clutch housing 22 has a retainer groove 84 that extends annularly about the inner cavity 26 and radially into the clutch housing 22 from the internal surface 24. The retainer ring 82 is received in the retainer groove 84. The retainer ring 82 projects into the inner cavity 26 from the retainer groove 84 to abut the first backing plate side 48. The retainer ring 82 therefore defines the predetermined limit 46 such that the retainer ring 82 prevents the backing plate 44 from moving longitudinally beyond the predetermined limit 46 in a direction moving away from the applied plate 54. Stated another way, the retainer ring 82 illustrated in FIGS. 1A through 3 prevents the backing plate 44 from moving longitudinally to the left past the predetermined limit 46 set by the retainer ring 82 and the retainer groove 84. Other types of the structure may be used for retaining the backing plate 44 longitudinally on the clutch housing 22. By way of example and without limitation, the backing plate 44 may be fixedly connected to the clutch housing 22 such that the backing plate 44 cannot move longitudinally with respect to the clutch housing 22 in either direction.

The primary actuator 40 acts to longitudinally compress the clutch pack 34 by pushing on and moving the applied plate 54 in the longitudinal direction toward the backing plate 44. As the applied plate 54 moves towards the backing plate 44, the applied plate 54 pushes both the plurality of friction plates 62 and the plurality of reaction plates 64 longitudinally toward the backing plate 44. Because the backing plate 44 is prevented from moving longitudinally beyond the predetermined limit 46, the plurality of friction plates 62 and the plurality of reaction plates 64 are squeezed between the applied plate 54 and the backing plate 44 as the primary actuator 40 pushes the applied plate 54 towards the backing plate 44, thus longitudinally compressing the clutch pack 34.

Figure 2:
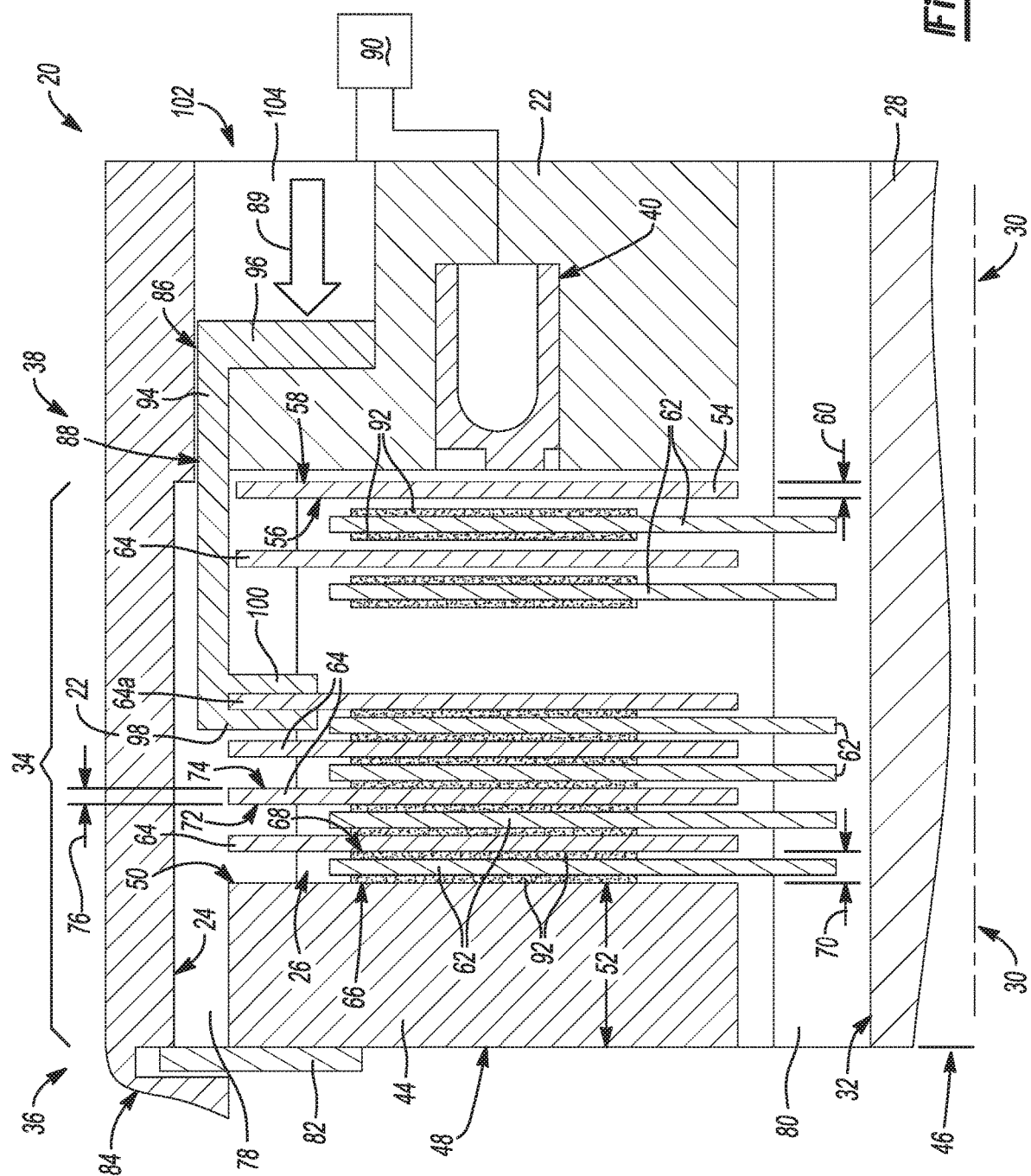
FIG. 2 is a partial, cross-sectional view of the clutch assembly of FIG. 1A where the secondary actuator is applying pressure to one of the reaction plates in the plurality of reaction plates.

In addition to the primary actuator 40, the disclosed clutch assembly 20 includes one or more secondary actuators 86. As shown in FIG. 1A, the one or more secondary actuators 86 each selectively and individually control the longitudinal movement of an applied reaction plate 64a of the plurality of reaction plates 64. Each of the secondary actuators 86 includes an actuation member 88 that extends to and contacts the applied reaction plate 64a. As shown in FIGS. 2 and 3, when the secondary actuator 86 is actuated, the actuation member 88 pushes on and longitudinally moves the applied reaction plate 64a in a first direction toward the backing plate 44. This movement occurs by applying a second pressure 89 to the actuation member 88, which is transmitted to the applied reaction plate 64a via the actuation member 88. With reference to FIG. 2, as the applied reaction plate 64a is moved in the first direction toward the backing plate 44 by the actuation members 88, the applied reaction plate 64a pushes a portion of the clutch pack 34, including those friction plates 62 and reactions plates 64 disposed longitudinally between the applied reaction plate 64a and the backing plate 44, toward the backing plate 44. Because the backing plate 44 is prevented from moving longitudinally beyond the predetermined limit 46, those friction plates 62 and reaction plates 64 disposed between the applied reaction plate 64a and the backing plate 44 are squeezed between the applied reaction plate 64a and the backing plate 44, thus longitudinally compressing that portion of the clutch pack 34. When the secondary actuator 86 is released, the applied reaction plate 64a moves longitudinally in a second direction toward the applied plate 54 to return to its original position.

The primary actuator 40 and the secondary actuator(s) 86 are operably connected to a controller 90 that controls actuation of the primary actuator 40 and the secondary actuator(s) 86. As will be explained in greater detail below, by controlling the timing between actuation of the secondary actuator(s) 86 relative to actuation of the primary actuator 40, the controller 90 can more evenly distribute peak temperatures across the clutch pack 34. It should be appreciated that the terms "primary" and "secondary" used in connection with the primary actuator 40 and the secondary actuator(s) 86 are used to differentiate the actuators 40, 86 from one another and are not used to designate an order of operation or order of importance.

In some configurations, including the configurations illustrated in FIGS. 1A through 3, the each friction plate 62 of the plurality of friction plates 62 includes a friction interface 92 disposed on at least one of the first side 66 and the second side 68 of the friction plate 62. The friction interface 92 transfers torque between the friction plate 62 and a directly adjacent reaction plate 64, applied plate 54, or backing plate 44 when the clutch pack 34 is compressed by the primary actuator 40, the secondary actuator(s) 86, or both. This torque transfer through the friction interfaces 92 of the friction plates 62 allows the clutch pack 34 to rotatably couple the clutch housing 22 and the shaft 28. As illustrated in FIGS. 1A through 3, the friction interface 92 may be disposed on the first and second sides 66, 68 of each friction plate 62 of the plurality of friction plates 62. In this configuration, rotation of shaft 28 drives rotation of the friction plates 62. When the clutch pack 34 is longitudinally compressed by the primary actuator 40 and/or the secondary actuator(s) 86, the friction interfaces 92 of the friction plates 62 contact the reaction plates 64, the first applied plate side 56 of the applied plate 54, and the second backing plate side 50 of the backing plate 44 to transmit torque from the shaft 28 to the clutch housing 22. The torque transmission provided by the friction interfaces 92 drives rotation of the clutch housing 22 when the clutch housing 22 is free to rotate. When the clutch assembly 20 is used as a brake, the clutch housing 22 is fixed (i.e. held stationary) and the torque transmission provided by the friction interfaces 92 act to brake (i.e. slow) the shaft 28. When the clutch assembly 20 is used as a brake, the clutch housing 22 may be fixed to or integrally formed with the transmission case. Such configurations are sometimes referred to as a stationary clutch. It should also be appreciated that in some configurations (not shown), friction interfaces may be applied to one or more of the reaction plates 64. Accordingly, the plurality of reaction plates 64 are not necessarily distinguished from the plurality of friction plates 62 by the presence or absence of the friction interface 92, but instead, the plurality of reaction plates 64 is a grouping of commonly rotating clutch plates that includes at least one plate that is independently driven by the secondary actuator(s) 86.

It should also be appreciated that the secondary actuator(s) 86 may alternatively apply pressure to one or more of the friction plates 62a. For example and without limitation, in the configuration shown in FIG. 1B the one or more secondary actuators 86 each selectively and individually control the longitudinal movement of an applied friction plate 62a of the plurality of friction plates 62. The actuation member 88 of each of the secondary actuators 86 extends to and contacts the applied friction plate 62a. When the secondary actuator 86 is actuated, the actuation member 88 pushes on and moves the applied friction plate 62a in the longitudinal direction toward the backing plate 44. This movement occurs by applying a second pressure 89 to the actuation member 88, which is transmitted to the applied friction plate 62a via the actuation member 88. Operation continues as shown in FIGS. 2 and 3 except that in the configuration illustrated in FIG. 1B, it is the applied friction plate 62a that is acted on by the secondary actuator 86.

Figure 1B:
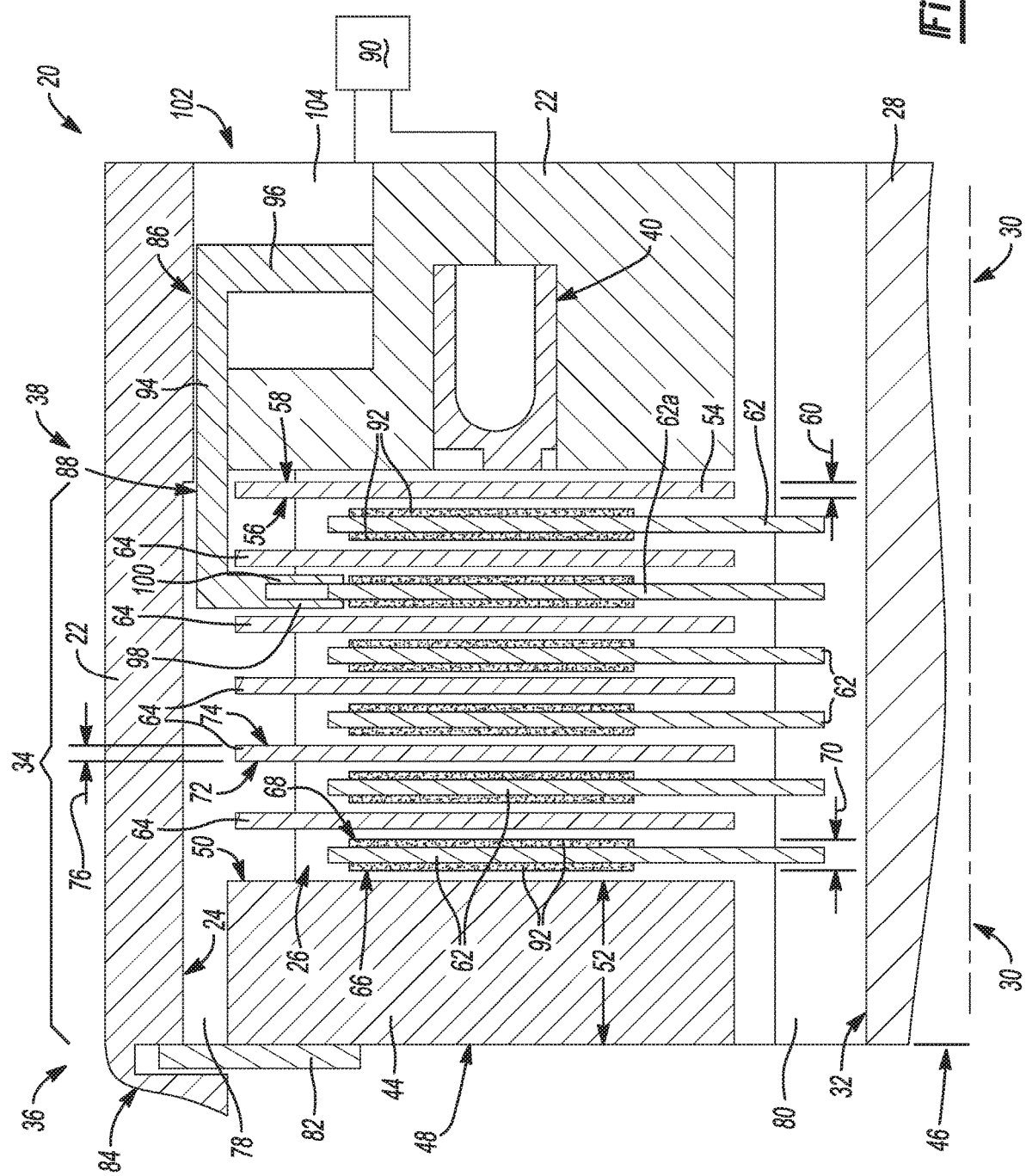
FIG. 1B is a partial, cross-sectional view of another exemplary clutch assembly constructed in accordance with the subject disclosure where the clutch pack is shown in an uncompressed state.

FIGS. 1A and 1B illustrate the clutch assembly 20 in the uncompressed state. The primary actuator 40 is not applying pressure to the applied plate 54 and the secondary actuator 86 is not applying pressure to the applied friction plate 62a (FIG. 1B) or the applied reaction plate 64a (FIG. 1A) so the clutch pack 34 remains uncompressed. The friction plates 62 are not squeezed between the applied plate 54, the reaction plates 64, or the backing plate 44 such that there is no torque being transmitted between the clutch housing 22 and the shaft 28. In FIG. 2, the clutch assembly 20 is shown where only the secondary actuator(s) 86 are applying the second pressure 89 to the applied reaction plate 64a. FIG. 3, illustrates the clutch assembly 20 where the clutch pack 34 has reached the compressed state. In the compressed state shown in FIG. 3, both the primary actuator 40 and the secondary actuator(s) 86 are applying pressure to the clutch pack 34. The primary actuator 40 is applying the first pressure 42 to the applied plate 54 and the secondary actuator(s) 86 are applying the second pressure 89 to the applied reaction plate 64a.

Figure 4:
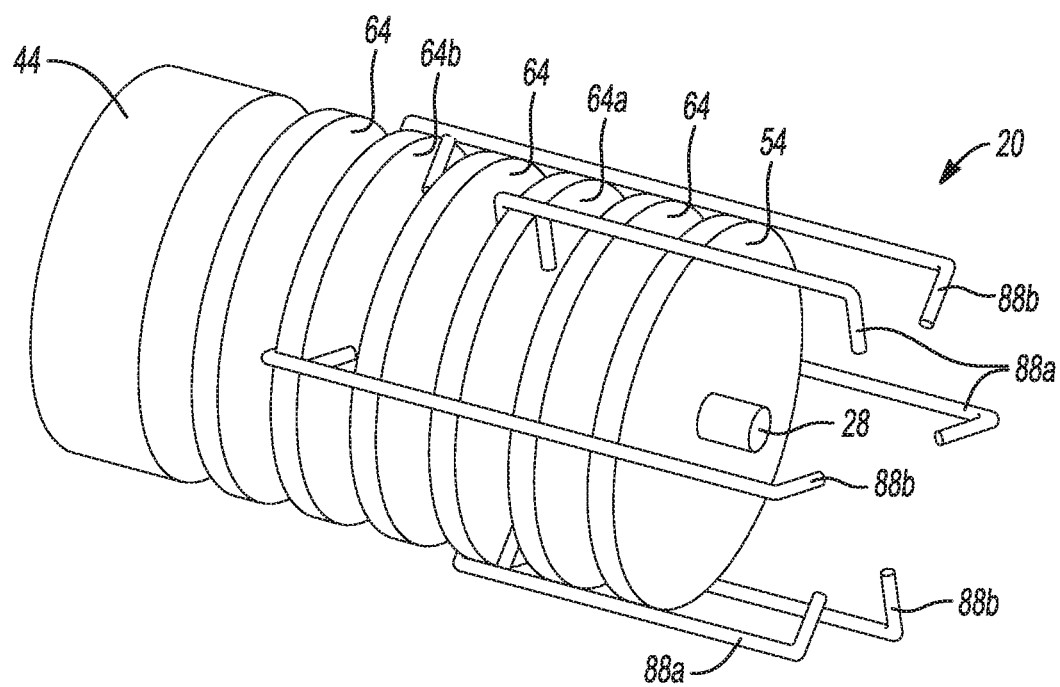
FIG. 4 is a front perspective view of the clutch pack and the secondary actuators of another exemplary clutch assembly constructed in accordance with the subject disclosure.
Figure 5:
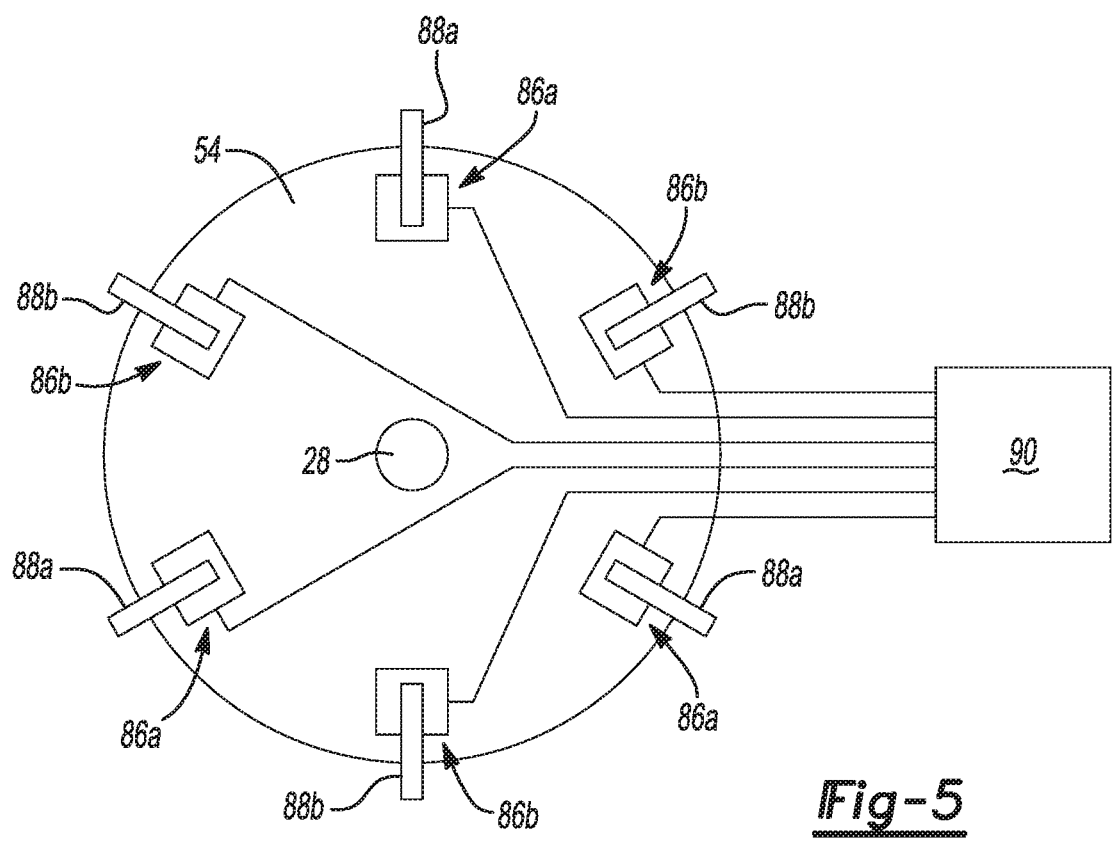
FIG. 5 is a front elevation view of the clutch pack and the secondary actuators of the clutch assembly of FIG. 4.

As shown in FIGS. 4 and 5, the actuation members 88 may include a first set of actuation members 88a and a second set of actuation members 88b and the secondary actuators 86 may include a first set of secondary actuators 86a and a second set of secondary actuators 86b. The first set of actuation members 88a may be phased (i.e. radially offset) with respect to the second set of actuation members 88b such that the first set of actuation members 88a do not interfere with the second set of actuation members 88b. In other words, the first set of actuation members 88a and the second set of actuation members 88b are radially disposed in a sequentially alternating pattern about the longitudinal axis 30. In this way, each actuation member 88a of the first set of actuation members 88a is radially spaced between two actuation members 88b of the second set of actuation members 88b and vice versa.

The first set of actuation members 88a extend between the first set of secondary actuators 86a and a first reaction plate 64a of the plurality of reaction plates 64. The second set of actuation members 88b extend between the second set of secondary actuators 86b and a second reaction plate 64b of the plurality of reaction plates 64. Accordingly, the first set of actuation members 88a and the first set of secondary actuators 86a cooperate to apply pressure to the first reaction plate 64a, causing the first reaction plate 64a to move longitudinally toward the backing plate 44. The second set of actuation members 88b and the second set of secondary actuators 86b cooperate to apply pressure to the second reaction plate 64b, causing the second reaction plate 64b to move longitudinally toward the backing plate 44. Additional sets of actuation members and secondary actuators may be provided where the movement of three or more of the reaction plates 64 in the clutch pack 34 are individually and independently controlled. It should also be appreciated that the number of actuation members 88 and secondary actuators 86 associated with each reaction plate 64 may vary and is not limited to the three in number shown in FIGS. 4 and 5. For example and without limitation, each reaction plate 64 may be controlled by a single actuation member 88 and a single secondary actuator 86.

Figure 6:
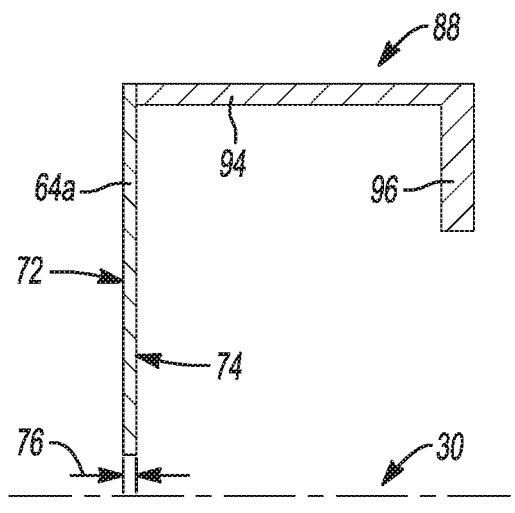
FIG. 6 is a partial, cross-sectional view of one of the reaction plates in the plurality of reaction plates and an exemplary actuation member constructed in accordance with the subject disclosure.
Figure 7:
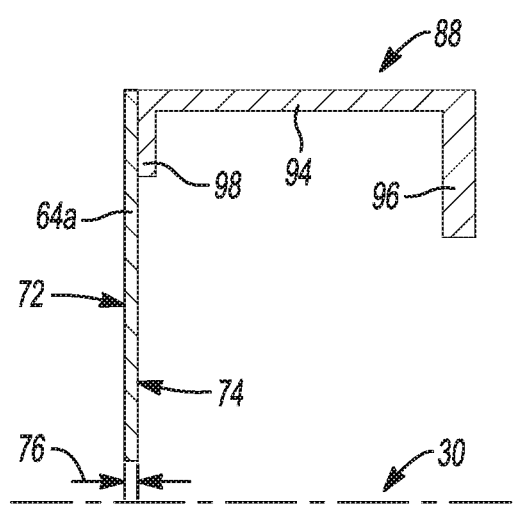
FIG. 7 is a partial, cross-sectional view of one of the reaction plates in the plurality of reaction plates and another exemplary actuation member constructed in accordance with the subject disclosure.
Figure 8:
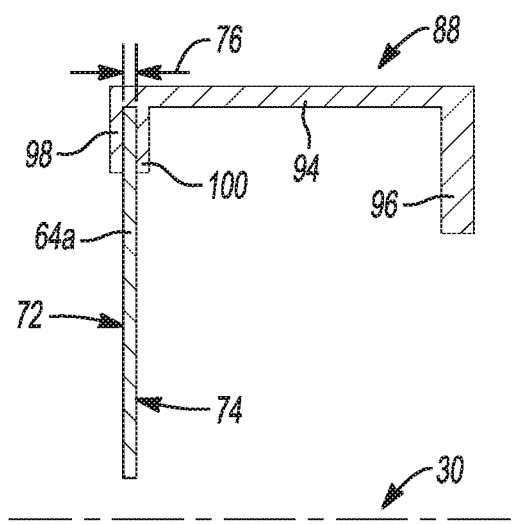
FIG. 8 is a partial, cross-sectional view of one of the reaction plates in the plurality of reaction plates and yet another exemplary actuation member constructed in accordance with the subject disclosure.

As shown in FIGS. 6 through 8, the actuation members 88 may have a variety of different geometric shapes. In the configuration illustrated in FIG. 6, the actuation member 88 extends in an L-shape, where the actuation member 88 includes a bridging portion 94 and a first leg 96 that extends transversely from one end of the bridging portion 94. The bridging portion 94 of the actuation member 88 may be parallel to the longitudinal axis 30 and generally extends past the applied plate 54 to one of the reaction plates 64 (see FIG. 1A). The first leg 96 may be perpendicular to the longitudinal axis 30. The secondary actuator 86 applies the second pressure 89 to the first leg 96. The end of the bridging portion 94 that is opposite the first leg 96 contacts the second face 74 of the applied reaction plate 64a during actuation of the secondary actuator 86. In some arrangements, the actuation member 88 may not be connected to the applied reaction plate 64a and only pushes the reaction plate 64a towards the backing plate 44. In other arrangements, the end of the bridging portion 94 that is opposite the first leg 96 may be fixedly connected to the applied reaction plate 64a. By way of example and without limitation, the end of the bridging portion 94 may be fixedly connected to the applied reaction plate 64a by a weld, a fastener, a press-fit connection, or adhesive.

In the configuration illustrated in FIG. 7, the actuation member 88 extends in a U-shape, where the actuation member 88 further includes a second leg 98 that extends transversely from the end of the bridging portion 94 opposite the first leg 96. As such, the second leg 98 is longitudinally spaced from the first leg 96 and the first and second legs 96, 98 may be parallel with one another. The second leg 98 contacts the second face 74 of the applied reaction plate 64a during actuation of the secondary actuator 86. Again, in some arrangements, the actuation member 88 may not be connected to the applied reaction plate 64a and only pushes the applied reaction plate 64a towards the backing plate 44. In other arrangements, the second leg 98 may be fixedly connected to the applied reaction plate 64a. By way of example and without limitation, the second leg 98 may be fixedly connected to the applied reaction plate 64a by a weld, a fastener, a press-fit connection, or adhesive.

In the configuration illustrated in FIG. 8, the actuation member 88 has a forked shape, where the actuation member 88 further includes a third leg 100 that extends transversely from the bridging portion 94 of the actuation member 88. The third leg 100 is positioned longitudinally along the bridging portion 94 between the first leg 96 and the second leg 98. As such, the third leg 100 is longitudinally spaced from the second leg 98 and the second and third legs 98, 100 may be parallel with one another. The second leg 98 and the third leg 100 are longitudinally spaced from one another by the fourth thickness 76 of the applied reaction plate 64a such that the applied reaction plate 64a is permanently received between the second leg 98 and the third leg 100 of the actuation member 88. More particularly, the second leg 98 of the actuation member 88 abuts the first face 72 of the applied reaction plate 64a and the third leg 100 of the actuation member 88 abuts the second face 74 of the applied reaction plate 64a. Accordingly, the applied reaction plate 64a is held between the second and third legs 98, 100 of the actuation member 88 such that the reaction plate 64a translates longitudinally with the actuation member 88 as the actuation member 88 is acted on by the secondary actuator 86.

Referring again to FIGS. 1A through 3, the clutch housing 22 extends inwardly adjacent the applied plate 54 and houses both the primary actuator 40 and the secondary actuators 86. Each of the secondary actuators 86 includes a driver 102 for generating the second pressure 89 (i.e. the force) that is transmitted to the applied reaction plate 64a via the actuation member 88. The driver 102 includes an actuator cavity 104 that is disposed within the clutch housing 22. The first leg 96 of the actuation member 88 is received in the actuator cavity 104. Fluid pressure within the actuator cavity 104 acts on the first leg 96 causing the first leg 96 and thus the actuation member 88 to translate longitudinally toward or away from the backing plate 44. The controller 90 controls fluid flow to the actuator cavity 104 and therefore controls the fluid pressure within the actuator cavity 104. In this way, the controller 90 can actuate the secondary actuators 86 and cause the actuation member 88 and the applied reaction plate 64a to move toward the backing plate 44 independent of actuation of the primary actuator 40. Optionally, a spring (not shown) may be disposed within the actuator cavity 104 that contacts the first leg 96 of the actuation member 88 to bias the actuation member 88 to a default position. For example, the actuation member 88 may be biased away from the backing plate 44. Notwithstanding the examples illustrated and described herein, where the secondary actuators 86 are fluid operated hydraulic actuators, the secondary actuators 86 may alternatively include, without limitation, mechanical, electrical, or electro-mechanical drivers.

Various alternative configurations are possible where the backing plate 44, the applied plate 54, the plurality of friction plates 62, and the plurality of reaction plates 64 are rotatably coupled to either the clutch housing 22 or the shaft 28 in different combinations. All such combination are considered to be within the scope of the subject disclosure. Additionally, it should be appreciated that the several views of the clutch assembly 20 in the Figures are partial cross-sectional views. Accordingly, the primary actuator 40 may be multiple actuators that individually apply the first pressure 42 to the applied plate 54. The disclosed clutch assembly 20 may also adjust torque transmission through the clutch pack 34 by varying the first pressure 42 that the primary actuator 40 applies to the applied plate 54. Under such a configuration, the primary actuator 40 may include multiple actuators that apply different first pressures 42 to the applied plate 54, respectively. The secondary actuators 86 may be annular in shape, or may alternatively be one or more discrete actuators that are positioned radially within the clutch housing 22 adjacent to either the applied plate 54 (as shown) or adjacent to the backing plate 44 (not shown). Where the secondary actuators 86 are disposed within the clutch housing 22 adjacent to the backing plate 44, the actuation members 88 may be oppositely oriented such that the actuation members 88 pull the one or more reaction plates 64 toward the backing plate 44 rather than pushing the one or more reaction plates 64 toward the backing plate 44 (as shown). The actuation members 88 may alternatively extend annularly about the clutch pack 34 in a coaxially nested relationship with one another. Although not shown in the Figures, one, some, or all of the reaction plates 64, the friction plates 62, the backing plate 44, and the applied plate 54 may be biased to certain longitudinal positions that can be measured in relation to retainer ring 82. By way of example and without limitation, such biasing may be accomplished by springs, actuators, inertia, or hydraulic pressure within the inner cavity 26. It should also be appreciated that although the figures illustrate wet-clutch assemblies, where the inner cavity 26 contains a fluid, the subject disclosure also applies to dry-clutch assemblies.

Figure 9:
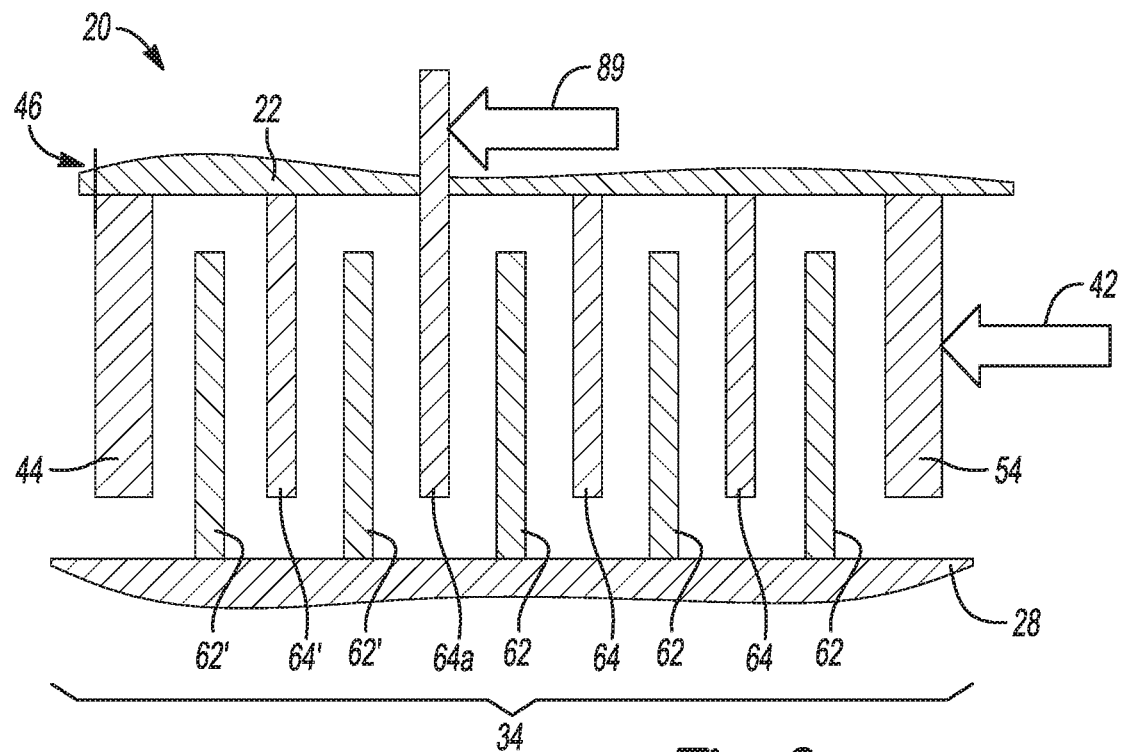
FIG. 9 is a partial, cross-sectional view of the clutch assembly of FIG. 1A illustrating an exemplary engagement method of the clutch pack where pressure is concurrently applied to the applied plate and one of the reaction plates in the plurality of reaction plates.
Figure 10:
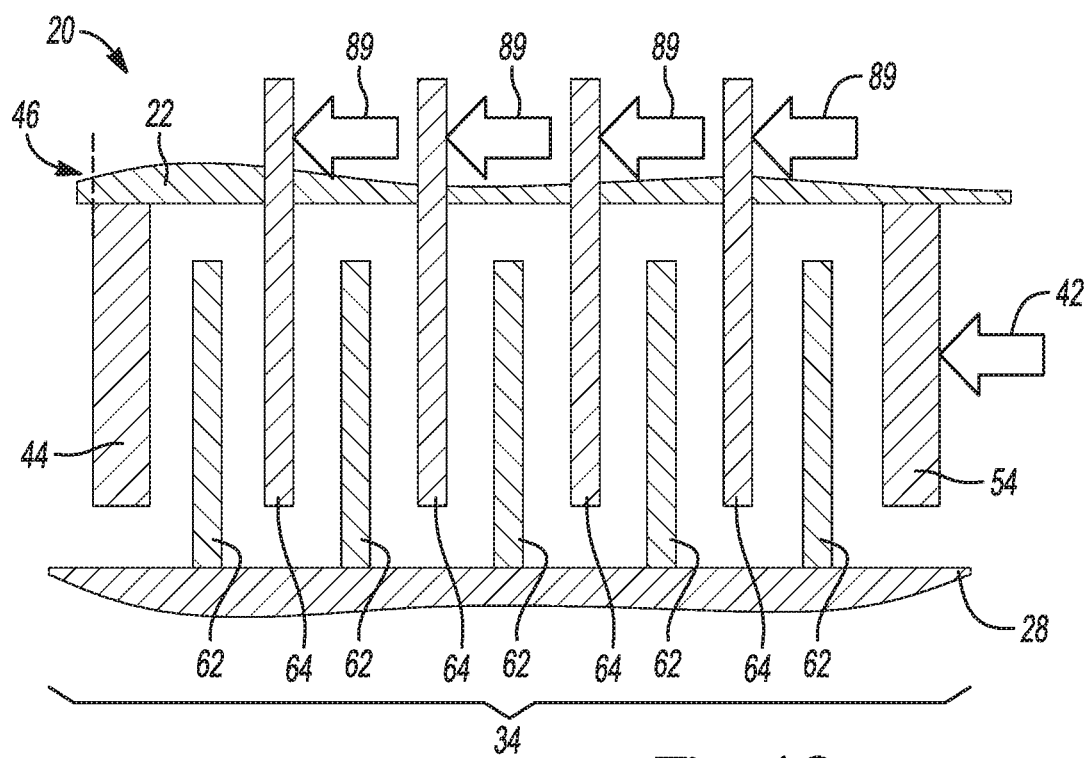
FIG. 10 is a partial, cross-sectional view of the clutch assembly of FIG. 1A illustrating another exemplary engagement method of the clutch pack where pressure is concurrently applied to the applied plate and each reaction plate of the plurality of reaction plates.

Referring to FIGS. 9 and 10, a method of engaging the clutch assembly 20 described above is illustrated. As explained above, the clutch assembly 20 generally includes shaft 28, clutch housing 22, and clutch pack 34. The clutch pack 34 includes backing plate 44 and applied plate 54. The plurality of friction plates 62 and the plurality of reaction plates 64 are disposed between the backing plate 44 and the applied plate 54 in an interleaving relationship. The method generally includes the steps of: applying torque to the shaft 28, preventing the backing plate 44 from traveling longitudinally beyond the predetermined limit 46 measured relative to the shaft 28 and the clutch housing 22, applying pressure to at least one reaction plate 64a in the plurality of reaction plates 64 to move the at least one reaction plate 64a longitudinally toward the backing plate 44, compressing any reaction plates 64' of the plurality of reaction plates 64 and any friction plates 62' of the plurality of friction plates 62 disposed between the at least one reaction plate 64a and the backing plate 44, applying pressure to the applied plate 54 to move the applied plate 54 longitudinally toward the backing plate 44, and compressing the plurality of reaction plates 64 and the plurality of friction plates 62 between the applied plate 54 and the backing plate 44 to transfer torque from the shaft 28 to the clutch housing 22 via the clutch pack 34. Accordingly, the step of compressing any reaction plates 64' and any friction plates 62' disposed between the at least one reaction plate 64a and the backing plate 44 results in compressing only a portion of the clutch pack 34. Further, it should be appreciated that the step of applying pressure to at least one reaction plate 64a of the plurality of reaction plates 64 may include applying the second pressure 89 to the at least one reaction plate 64a and the step of applying pressure to the applied plate 54 may include applying the first pressure 42 to the applied plate 54.

As illustrated in FIG. 9, the step of applying pressure to the at least one reaction plate 64a may be performed concurrently with the step of applying pressure to the applied plate 54. Advantageously, this engagement methodology reduces localized temperature spikes in the clutch pack 34 adjacent to the applied plate 54 because torque from the shaft 28 is split between at least two longitudinally spaced regions during clutch engagement. This creates more uniform temperatures across the clutch pack 34 in comparison to other designs where torque and thus heat generation is localized at a single friction interface disposed adjacent to the applied plate 54. Also, kiss point torque can be controlled without varying the second pressure 89. Other clutch assemblies require careful calibration of the pressure initially applied to the applied plate 54 because excessive pressure can cause excessive torque transfer at the kiss point (i.e. where the friction interfaces first engage), causing poor shift quality. Because the number of engaged friction plates 62' can be controlled by the disclosed method, kiss point torque can be controlled without calibration of the second pressure 89 since only a limited number of friction plates 62' will be compressed regardless of how great the second pressure 89 may be. As illustrated in FIG. 10, the step of applying pressure to the at least one reaction plate 64a may further include individually applying pressure to each reaction plate 64 in the plurality of reaction plates 64 to uniformly move the plurality of reaction plates 64 towards the backing plate 44 at the same time. This acts to more uniformly divide the torque and therefore more evenly distributes friction generated heat longitudinally across the clutch pack 34 while achieving maximum torque transfer.

Figure 11:
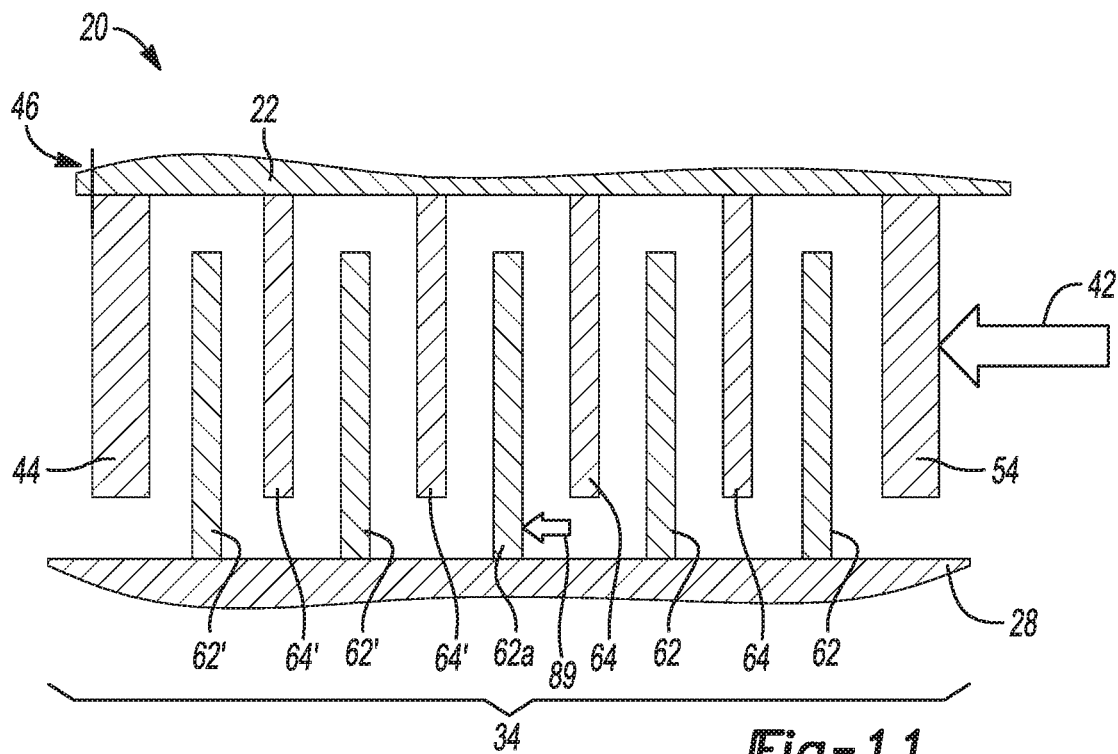
FIG. 11 is a partial, cross-sectional view of the clutch assembly of FIG. 1B illustrating an exemplary engagement method of the clutch pack where pressure is concurrently applied to the applied plate and one of the reaction plates in the plurality of reaction plates.
Figure 12:
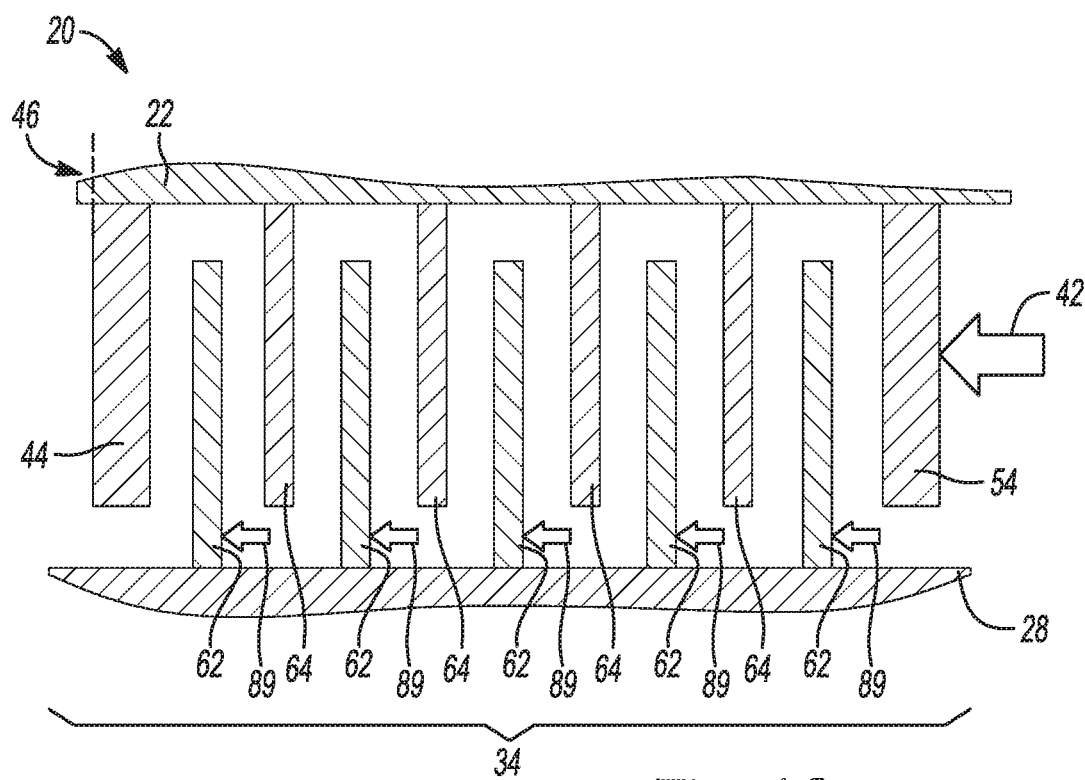
FIG. 12 is a partial, cross-sectional view of the clutch assembly of FIG. 1B illustrating another exemplary engagement method of the clutch pack where pressure is concurrently applied to the applied plate and each reaction plate of the plurality of reaction plates.

Referring to FIGS. 11 and 12, a variation of the method of engaging the clutch assembly 20 described above is illustrated where the steps of applying pressure to at least one reaction plate 64a in the plurality of reaction plates 64 to move the at least one reaction plate 64a longitudinally toward the backing plate 44 is replaced by the step of applying pressure to at least one friction plate 62a in the plurality of friction plates 62 to move the at least one friction plate 62a longitudinally toward the backing plate 44. As a result, the method further includes the step of compressing any reaction plates 64' of the plurality of reaction plates 64 and any friction plates 62' of the plurality of friction plates 62 disposed between the at least one friction plate 62a and the backing plate 44. It should be appreciated that the step of applying pressure to at least one friction plate 62a of the plurality of friction plates 62 may include applying the second pressure 89 to the at least one friction plate 62a and the step of applying pressure to the applied plate 54 may include applying the first pressure 42 to the applied plate 54.

As illustrated in FIG. 11, the step of applying pressure to the at least one friction plate 62a may be performed concurrently with the step of applying pressure to the applied plate 54. Advantageously, this engagement methodology reduces localized temperature spikes in the clutch pack 34 adjacent to the applied plate 54 because torque from the shaft 28 is split between at least two longitudinally spaced regions during clutch engagement. This creates more uniform temperatures across the clutch pack 34 in comparison to other designs where torque and thus heat generation is localized at a single friction interface disposed adjacent to the applied plate 54. Also, kiss point torque can be controlled without varying the second pressure 89. Other clutch assemblies require careful calibration of the pressure initially applied to the applied plate 54 because excessive pressure can cause excessive torque transfer at the kiss point (i.e. where the friction interfaces first engage), causing poor shift quality. Because the number of engaged friction plates 62' can be controlled by the disclosed method, kiss point torque can be controlled without calibration of the second pressure 89 since only a limited number of friction plates 62' will be compressed regardless of how great the second pressure 89 may be. As illustrated in FIG. 12, the step of applying pressure to the at least one friction plate 62a may further include individually applying pressure to each friction plate 62 in the plurality of friction plates 62 to uniformly move the plurality of friction plates 62 towards the backing plate 44 at the same time. This acts to more uniformly divide the torque and therefore more evenly distributes friction generated heat longitudinally across the clutch pack 34 while achieving maximum torque transfer.

Further still, the step of applying pressure to at least one of the friction plates and reaction plates 62a, 64a may be performed at a first time and the step of applying pressure to the applied plate 54 may be performed at a second time that is different than the first time. For example and without limitation, the second time (where the first pressure 42 is applied to the applied plate 54) may be later than the first time (where the second pressure 89 is applied to at least one of the friction plates and reaction plates 62a, 64a). Thus, by delaying longitudinal movement of the applied plate 54 toward the backing plate 44, some of the friction generated heat has already been dissipated at the friction interface at or adjacent to the at least one friction plate 62a and/or the at least one reaction plate 64a therefore reducing localized temperature spikes in the clutch pack at or adjacent to the applied plate 54. This methodology also provides enhanced control of the torque versus time function of the clutch assembly 20 during a launch or shift. A more consistent and gradual increase in torque transfer through the clutch pack 34 can be achieved, which can result in improved noise, vibration, and harshness and improved drivability characteristics. As yet another option, the step of applying pressure to at least one of the friction plates and reaction plates 62a, 64a and the step of compressing the reaction plates 64' and the friction plates 62' disposed between the backing plate 44 and the at least friction plate 62a and/or the at least one reaction plate 64a may be performed during every other engagement of the clutch pack 34. In this way, temperature spikes in the clutch pack 34 can be switched from at or near the applied plate 54 to at or near the at least one friction plate 62a and/or the at least one reaction plate 64a with every other engagement to reduce localized heat build-up in the clutch pack 34 resulting from repeated engagements of the clutch pack 34 during a short time span.

The controller 90 may generally be configured to control the application of pressure to the applied plate 54 and the at least one friction plate 62a and/or the at least one reaction plate 64a in accordance with the various aspects of the method described above. For example and without limitation, where pressure is applied to the at least one reaction plate 64a during every other engagement of the clutch pack 34, the controller may include a processor and memory. The processor of the controller 90 may count every engagement of the clutch pack 34 and generate a clutch engagement count identifying the number of times that the clutch pack 34 has been compressed. The memory of the controller 90 may be used to store the clutch engagement count such that the processor of the controller 90 can increment the clutch engagement count over time. The controller 90 may operably control the second actuator 86 to apply pressure to the at least one reaction plate 64a only when the clutch engagement count is an odd number or only when the clutch engagement count is an even number. Advantageously, this reduces the likelihood of overheating because the cycling time between temperature rises in first end 36 and the second end 38 of the clutch pack 34 is essentially doubled, giving the first end 36 and the second end 38 of the clutch pack 34 more time to cool before the next temperature rise.

As explained above, the engagement of the clutch pack 34 may act to either drive rotation of the clutch housing 22 or to brake the shaft 28. Where engagement of the clutch pack 34 drives rotation of the clutch housing 22, the step of compressing the plurality of reaction plates 64 and the plurality of friction plates 62 between the applied plate 54 and the backing plate 44 causes the clutch housing 22 to rotate at the same speed as the shaft 28. Where the clutch pack 34 acts as a brake, the clutch housing 22 is rotationally fixed and the step of compressing the plurality of reaction plates 64 and the plurality of friction plates 62 between the applied plate 54 and the backing plate 44 slows rotation of the shaft 28.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. These antecedent recitations should be interpreted to cover any combination in which the inventive novelty exercises its utility. Many modifications and variations of the present invention are possible in light of the above teachings and may be practiced otherwise than as specifically described while within the scope of the appended claims.

What is claimed is:

1. A method of engaging a clutch assembly having a shaft, a clutch housing, and a clutch pack including a backing plate, an applied plate, and a plurality of friction plates and reaction plates disposed between the backing plate and the applied plate in an interleaving relationship, the method comprising the steps of:
   applying torque to the shaft;
   preventing the backing plate from traveling longitudinally beyond a predetermined limit measured relative to the shaft and the clutch housing;
   applying a first pressure to at least one plate in the plurality of friction plates and reaction plates to move the at least one plate longitudinally toward the backing plate in order to compress at least a portion of the clutch pack disposed between the at least one plate and the backing plate; and
   applying a second pressure to the applied plate to move the applied plate longitudinally toward the backing plate in order to compress all of the friction plates and reaction plates in the clutch pack to transfer torque from the shaft to the clutch housing via the clutch pack.

2. The method as set forth in claim 1 wherein said step of applying the first pressure to the at least one plate includes individually applying pressure to each friction plate in the plurality of friction plates and reaction plates to move each friction plate towards the backing plate.

3. The method as set forth in claim 2 wherein the same pressure is individually applied to each friction plate in the plurality of friction plates and reaction plates.

4. The method as set forth in claim 2 wherein different pressures are applied to different friction plates in the plurality of friction plates and reaction plates.

5. The method as set forth in claim 1 wherein said step of applying the first pressure to the at least one plate includes individually applying pressure to each reaction plate in the plurality of friction plates and reaction plates to move each reaction plate towards the backing plate.

6. The method as set forth in claim 5 wherein the same pressure is individually applied to each reaction plate in the plurality of friction plates and reaction plates.

7. The method as set forth in claim 5 wherein different pressures are applied to different reaction plates in the plurality of friction plates and reaction plates.

8. The method as set forth in claim 1 wherein said step of applying the first pressure to the at least one plate includes applying the first pressure to at least one friction plate in the plurality of friction plates and reaction plates to compress only a portion of the clutch pack.

9. The method as set forth in claim 1 wherein said step of applying the first pressure to the at least one plate includes applying the first pressure to at least one reaction plate in the plurality of friction plates and reaction plates to compress only a portion of the clutch pack.

10. The method as set forth in claim 1 wherein said step of applying the first pressure to the at least one plate includes applying the first pressure to only one friction plate in the plurality of friction plates and reaction plates to compress only a portion of the clutch pack.

11. The method as set forth in claim 1 wherein said step of applying the first pressure to the at least one plate includes applying the first pressure to only one reaction plate in the plurality of friction plates and reaction plates to compress only a portion of the clutch pack.

12. The method as set forth in claim 1 wherein the first pressure and the second pressure are applied in the same direction.

13. The method as set forth in claim 1 wherein the first pressure and the second pressure are equal.

14. The method as set forth in claim 1 wherein the first pressure and the second pressure are different.

15. The method as set forth in claim 1 wherein said step of applying the first pressure to the at least one plate is performed concurrently with said step of applying the second pressure to the applied plate to reduce localized temperature spikes in the clutch pack adjacent to the applied plate.

16. The method as set forth in claim 1 wherein said step of applying the first pressure to the at least one plate is performed at a first time and said step of applying the second pressure to the applied plate is performed at a second time that is different than the first time to reduce localized temperature spikes in the clutch pack adjacent to the applied plate.

17. The method as set forth in claim 1 wherein said step of applying the first pressure to the at least one plate is performed at a first time and said step of applying the second pressure to the applied plate is performed at a second time that is later than the first time to reduce localized temperature spikes in the clutch pack adjacent to the applied plate.

18. The method as set forth in claim 1 wherein said step of applying the second pressure to the applied plate causes the clutch housing to rotate at the same speed as the shaft.

19. The method as set forth in claim 1 wherein the clutch housing is rotationally fixed and wherein said step of applying the second pressure to the applied plate slows rotation of the shaft.

* * * * *